(12) United States Patent
Kinnard et al.

(10) Patent No.: US 7,647,686 B1
(45) Date of Patent: Jan. 19, 2010

(54) METHOD FOR PRODUCING A PROFILE EDGE ON A STOCK PART

(75) Inventors: Steve P. Kinnard, Franklin, WI (US); Eugene T. Plitt, Muskego, WI (US)

(73) Assignee: Bay View Industries, Inc., Oak Creek, WI (US)

( * ) Notice: Subject to any disclaimer, the term of this patent is extended or adjusted under 35 U.S.C. 154(b) by 0 days.

(21) Appl. No.: 12/136,496

(22) Filed: Jun. 10, 2008

Related U.S. Application Data

(62) Division of application No. 10/371,555, filed on Feb. 21, 2003, now Pat. No. 7,383,627.

(51) Int. Cl.
*B21B 1/46* (2006.01)

(52) U.S. Cl. ...................................... 29/527.1

(58) Field of Classification Search ................. 29/527.1, 29/443, 525, 428, 717; 108/27; 428/99, 428/122, 192; 248/345.1
See application file for complete search history.

(56) References Cited

U.S. PATENT DOCUMENTS

| | | |
|---|---|---|
| 3,393,720 A | 7/1968 | Fenlin |
| 4,548,065 A | 10/1985 | Vyhnal |
| 4,558,553 A | 12/1985 | Kolk |
| 4,776,557 A | 10/1988 | Turner |
| 4,858,413 A * | 8/1989 | Grushka ...................... 108/27 |
| 5,129,975 A | 7/1992 | Easterle et al. |
| 5,208,084 A | 5/1993 | Rutz |
| 5,253,932 A | 10/1993 | Nesovic |
| 5,546,873 A | 8/1996 | Conner et al. |
| 5,628,257 A | 5/1997 | Conner et al. |
| 6,025,047 A | 2/2000 | Catta et al. |
| 6,523,486 B1 | 2/2003 | Plitt et al. |

* cited by examiner

*Primary Examiner*—John C Hong
(74) *Attorney, Agent, or Firm*—Reinhart Boerner Van Deuren s.c.

(57) ABSTRACT

The present invention relates generally to a tooling system and method for producing a profile edge on a stock part, for example, by casting a profile edge to a stock part, such as a table or the like. The tooling system is adapted to accommodate any stock part and generally includes a flexible tool device, a stock part with opposed ends defining an edge therebetween, and a securing device.

9 Claims, 4 Drawing Sheets

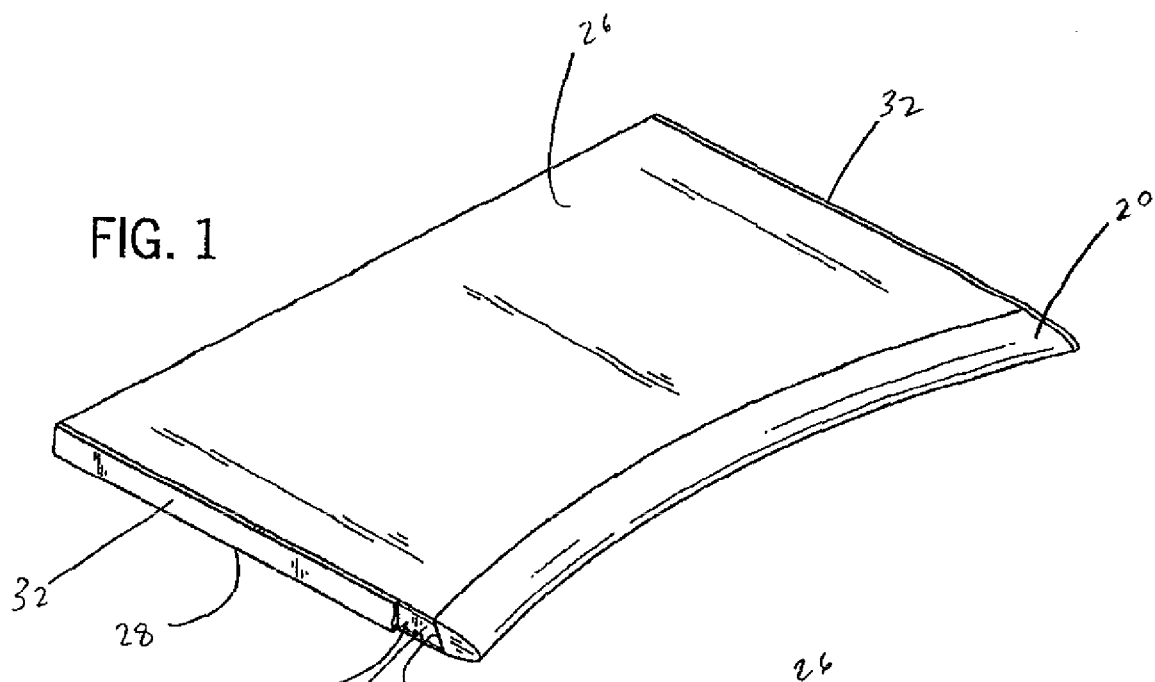
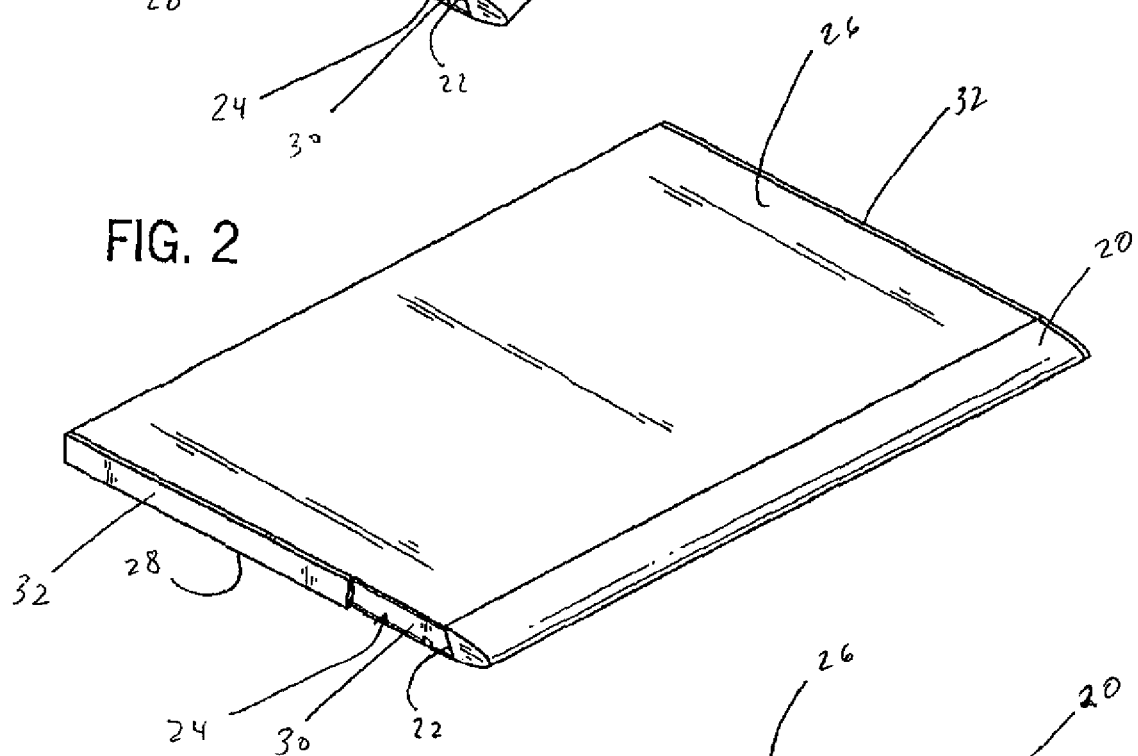
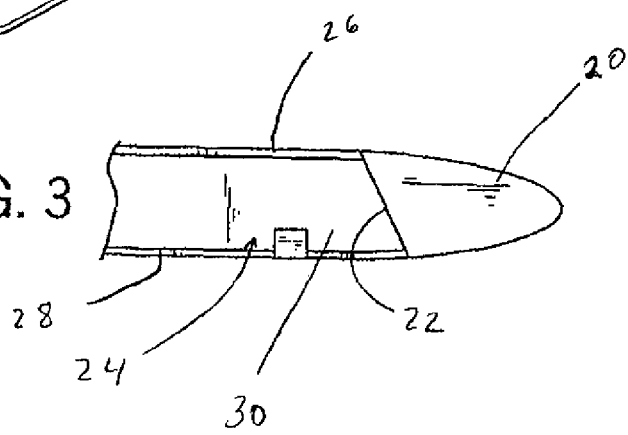

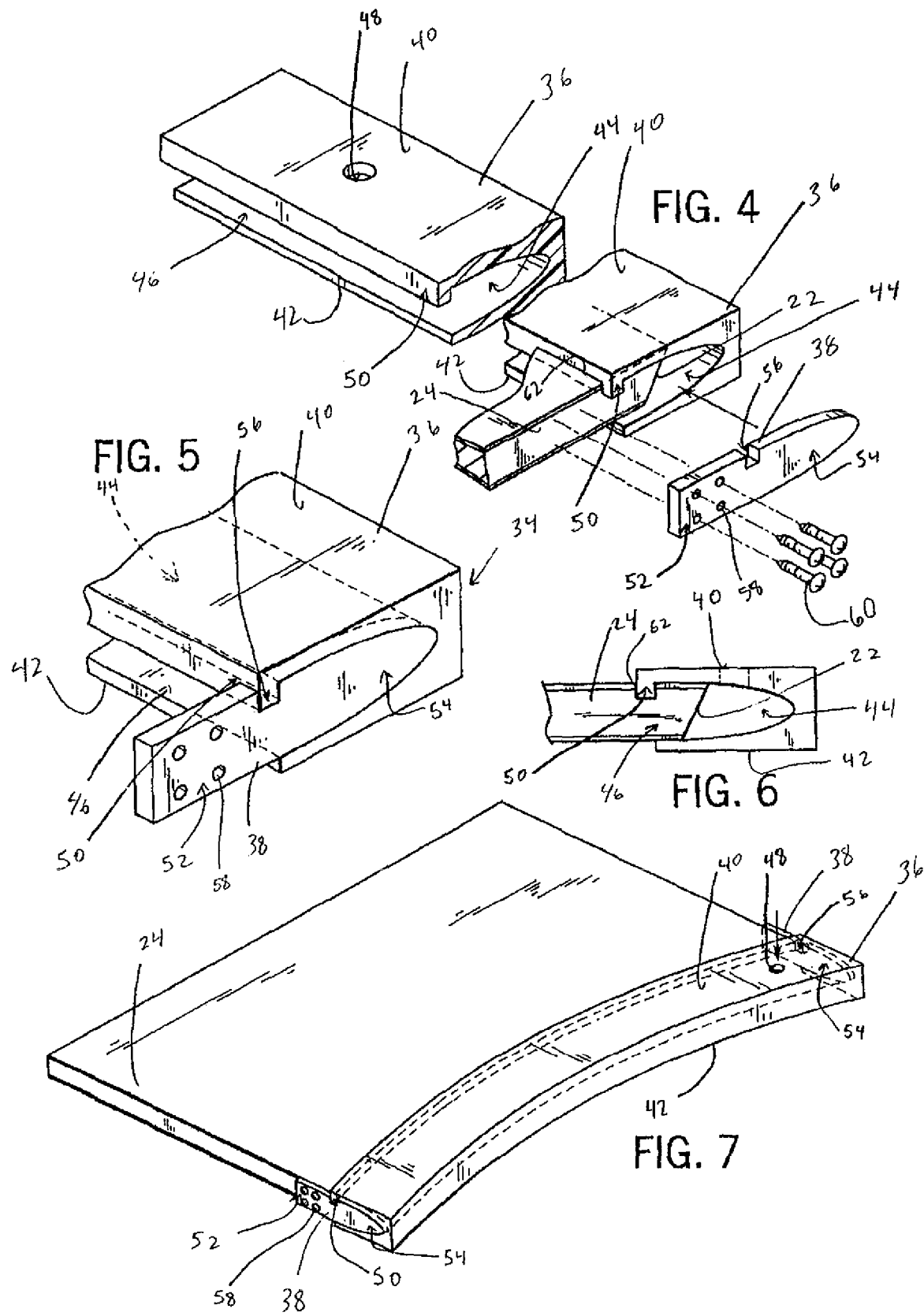

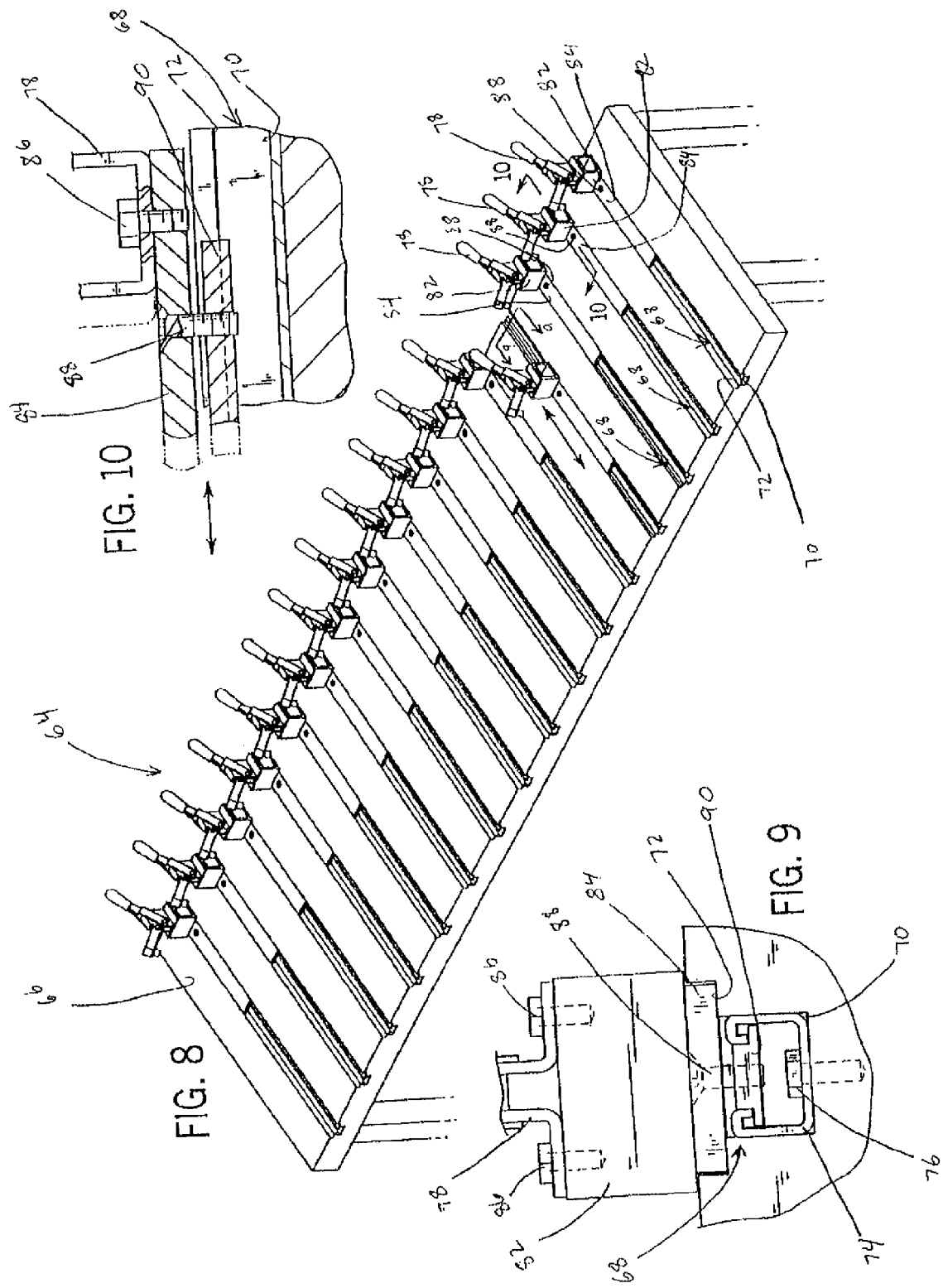

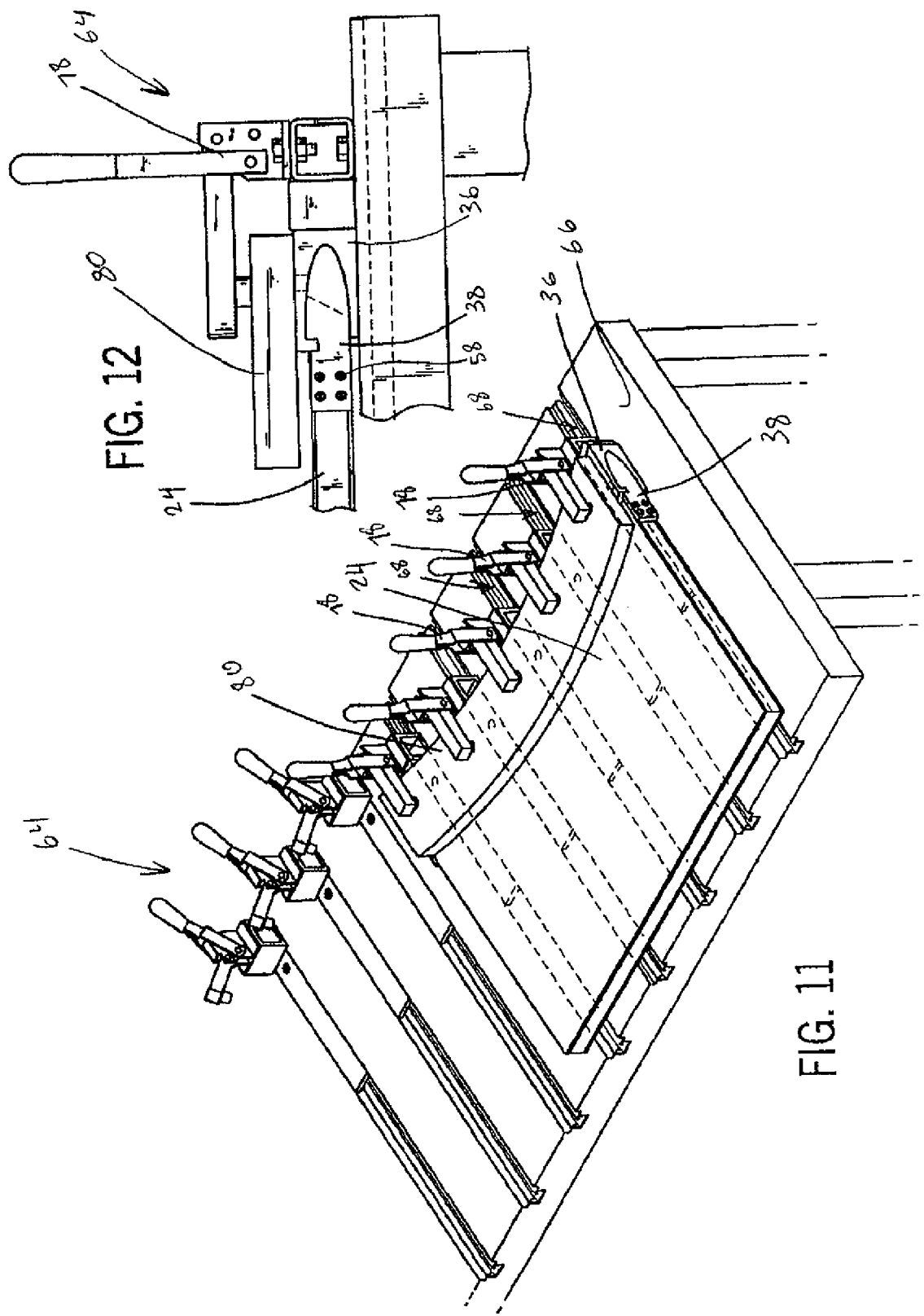

METHOD FOR PRODUCING A PROFILE EDGE ON A STOCK PART

This application is a divisional of and claims priority benefit from application Ser. No. 10/371,555, filed on Feb. 21, 2003 and issued as U.S. Pat. No. 7,383,627 on Jun. 10, 2008, the entirety of which is incorporated herein by reference.

BACKGROUND

Field of the Invention

The present invention relates generally to a tooling system and method for producing a profile edge on a stock part, for example, by casting a profile edge to a stock part, such as a table or the like. More specifically, the tooling system of the present invention relates to a flexible tool device and securing device, which are adapted to shape to any stock part.

In an increasing effort to make learning and training sessions more interactive, university lecture halls and workplace training rooms have removed conventional single-person desks and replaced them with arced tabletops. For example, in "interactive" university lecture halls, arced tables are positioned around a center lectern in an attempt to place all the students as close to the professor as possible to increase student-professor interaction. But, because the distances between each table and the lectern vary, the tables must be shaped in arcs of varying degrees.

Today's arced tables are generally manufactured from a particleboard or plywood base. The desired table shape is first cut from particleboard. Then, in a time and cost effective manner, the upper and lower surfaces of the particleboard are covered with a generally planar layer of laminate. But, unlike the application of laminate to a consistently planar surface, the demand for varying shapes and sizes of tables has made it difficult for manufacturers to efficiently and cost effectively apply protective edging to tables.

In the past, many table manufacturers have attempted to merely "cap" the unfinished edges of particleboard tables using a strip-like, snap-in plastic edging. For example, manufacturers would first detail a continuous groove into each table edge. A flexible plastic edging would then snap into place within the groove along the table edges.

While such edging proved sufficiently flexible to conform to any variety of contoured table edge, its simple snap-in attachment lacked the permanence and rigidity that was needed. Consequently, those students or trainees that used the tables would tend to remove, tear, or even mutilate the edging to the point that it would have to be continuously replaced. In short, the snap-in plastic edging has become too expensive to be feasible.

In an effort to improve upon the shortcomings of snap-in edging, table manufacturers have turned their attention toward the development of a rigid, permanent edging solution, specifically, casted urethane edging, such as polyurethane. Casted urethane edging is particularly popular due to its durability and permanent ruggedness. Two conventional tooling systems and methods for casting urethane directly to the edge of a table are generally known in the art.

One system includes the use of a "hard tool." Creation of a hard tool first entails the machining of a cavity within a medium, such as an aluminum block. The cavity must represent the exact table edge geometry and desired profile edge configuration. For example, if a round table is to be completely edged, a hard tool representing the entire peripheral edge of the table must be machined.

Once the specific hard tool has been machined, the stock part is placed within it. A resinous substance is then injected into the machined aluminum tool through an injection inlet, whereby the resinous substance fills the void between the inner portion of the machined aluminum tool and the enclosed stock part edge. The resinous substance will then cure as a rigid, casted urethane profile edge.

While manufacturers continue to utilize hard tools for the casting of urethane edging, such a method proves limiting in that it is inefficient and very costly. Specifically, each machined hard tool can generally only be used for one specific size and shape of stock part. For example, to apply a casted urethane profile edge to tables having different geometric shapes or sizes, a specific hard tool for each table must first be machined. Accordingly, the use of hard tools for the casting of urethane profile edges to tables of varying sizes and shapes is inefficient, expensive, and impractical.

Another conventional method of casting a urethane profile edge to an unfinished stock part edge entails using a "hard urethane tool." This type of tooling generally requires significant preparation before the casting of the urethane profile edge ever occurs. For example, a master tool set corresponding to the specific stock part geometry and desired profile edge configuration must first be created. The master tool set generally consists of a master carrier, master part, and master cover. All of the components of the master tool set must specifically correspond to the geometry and desired profile edge configuration of the specific stock part.

Once the specific master tool set has been tooled, a "rubber band," as known in the art, is created. The flexible and manageable rubber band will have an inner cavity that represents the specific stock part geometry and desired profile edge configuration. The rubber band is then stretched and fitted over and around the entire stock part edging.

The stock part and corresponding stretched rubber band are next inserted into a production carrier, which also must specifically correspond to the stock part geometry and desired profile edge configuration. A production cover plate is then used to enclose the rubber band and stock part within the production carrier, which will receive a second resinous substance. Similar to the molding process that occurs when forming the rubber band, the second resinous substance will flow into the cavity between the unfinished edge of the stock part and rubber band and cure as a rigid, casted urethane profile edge.

Like the aforementioned machined hard tool, the advantages of using a hard urethane tool for the casting of urethane profile edging are outweighed by the shortcomings. Specifically, a new master tool set, rubber band, and production carrier must be produced for each size and shape of stock part edge configuration. In short, using a hard urethane tool to cast a urethane profile edge to a stock part edge is very expensive and time-consuming and presents no distinct advantage over the machined hard tool approach.

The previously known methods and apparatuses for casting urethane profile edges to unfinished stock part edges have been used in the industry without any marked improvement to date. Consequently, the conventional methods and apparatuses remain inefficient, overly expensive, and generally inadequate for the efficient, low-cost application of urethane profile edging to stock part edges of varying sizes and contours.

It is accordingly the primary objective of the present invention that it provide a tooling system and method for producing a profile edge on any stock part, for example, by casting a profile edge to a stock part, such as a table or the like.

It is another objective of the present invention that the tooling system include a flexible tool device that can be adapted to shape to any stock part edge.

It is an additional objective of the present invention that the tooling system further include a securing device adapted to accommodate and secure a flexible tool device to any stock part during the production of a profile edge.

The tooling system and method of the present invention must also be of a construction which is both durable and long lasting, and it should also require little or no maintenance to be provided by the user throughout its operating lifetime. In order to enhance the market appeal of the tooling system and method of the present invention, it should also be of inexpensive construction to thereby afford it the broadest possible market. Finally, it is also an objective that all of the aforesaid advantages and objectives be achieved without incurring any substantial relative disadvantage.

SUMMARY

The disadvantages and limitations of the background art discussed above are overcome by the present invention. Specifically, the present invention provides a tooling system and method for producing a profile edge on a stock part, for example, by casting a profile edge to a stock part, such as a table or the like. The present invention is highly advantageous over conventional systems and methods because it is efficient, inexpensive, and adapted for the application of a profile edging to any stock part, regardless of size or contour.

Accordingly, the tooling system of the present invention generally includes a flexible tool device, a stock part with opposed ends defining an edge therebetween, and a securing device. More specifically, the flexible tool device of the present invention includes an elongated flexible tool and at least one plug. The flexible tool, which has opposing first and second portions and an elongated cavity defined therebetween, indexes with a stock part, wherein one of the flexible tool and the stock part includes at least one indexing portion to be received by the other. The elongated cavity of the flexible tool opens to a first side of the flexible tool and generally defines the profile edge configuration that will be produced on a stock part.

The plug of the flexible tool device generally includes both a first portion and a second portion. The first portion of the plug can be removably received by the elongated cavity defined within the flexible tool. The second portion of the plug can be removably affixed to the stock part at an angle with respect to the profile edge to be produced.

The stock part of the present invention includes opposing ends defining an edge therebetween. The defined edge removably engages with the flexible tool through an indexing relationship. Finally, at least one of the opposing ends of the stock part removably engages with the plug.

The securing device of the present invention can adjustably secure a flexible tool device to any stock part. Specifically, the securing device generally includes a surface component and at least one adjustable securing component, the securing component being adjustable to any position upon the surface component of the securing device to secure the flexible tool device to the stock part.

The present invention also includes a method of using the aforementioned tooling system to produce a profile edge on a stock part, for example, by casting a profile edge on a stock part, such as a table or the like. Specifically, the method includes contouring a flexible tool device to a stock part; adjustably positioning at least one securing component on a securing device to adjustably engage with the flexible tool device and secure it to a stock part; and introducing an edge material into the flexible tool device, the edge material curing as a profile edge on the stock part.

In part, the present invention can also include a method of using a flexible tool device to produce a profile edge on a stock part. Such a method comprises (1) providing a stock part with opposed ends defining an edge therebetween; (2) adjusting or flexing a flexible tool to contour or conform with the stock part edge, such a flexible tool comprising opposing first and second portions defining a cavity therebetween; and (3) introducing an edge material into the flexed, contoured flexible tool cavity. As described elsewhere herein, the flexible tool of this invention comprises a connector component coupling the aforementioned first and second portions. Such a component is of a compositional choice and dimensional configuration sufficient to contour, conform with or index to the stock part edge. The compositional and dimensional characteristics of such a tool and/or the connector component thereof can vary depending upon a particular stock part, edge or contour, such characteristics as would be understood by those skilled in the art made aware of this invention.

It may therefore be seen that the present invention teaches a tooling system and method for producing a profile edge on a stock part, for example, by casting a profile edge on a stock part, such as a table or the like. More specifically, the tooling system of the present invention discloses a flexible tool device and securing device, which are adapted to shape to any stock part. Thus, using the apparatuses of the present invention as a system provides an efficient and inexpensive method for producing a profile edge on a stock part, for example, by casting a profile edge to a stock part, such as a table or the like.

The tooling system and method of the present invention is of a construction which is both durable and long lasting, and which will require little or no maintenance to be provided by the user throughout its operating lifetime. The tooling system and method of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 1 is a perspective view of a stock part having an arced profile edge;

FIG. 2 is a perspective view of a stock part having a generally straight profile edge;

FIG. 3 is a fragmentary end view of a stock part having the profile edge of FIG. 2;

FIG. 4 is an exploded perspective view of the flexible tool and plug of the present invention and a stock part;

FIG. 5 is a fragmentary perspective view of the flexible tool and plug of FIG. 4;

FIG. 6 is an end view of the flexible tool and stock part of FIG. 4;

FIG. 7 is a perspective view of the flexible tool and plug of the present invention indexed to a stock part;

FIG. 8 is a perspective view of the securing device of the present invention;

FIG. 9 is a rearward view of the securing device of FIG. 8, taken along arrows 9-9;

FIG. 10 is a section view of the securing device of FIG. 8, taken along arrows 10-10;

FIG. 11 is a perspective view of the securing device, flexible tool, and plug of the present invention secured to a stock part; and FIG. 12 is an end view of FIG. 11.

DETAILED DESCRIPTION OF EMBODIMENTS

Certain embodiments of the tooling system and method for producing a profile edge on a stock part, for example, by casting a profile edge on a stock part, such as a table or the like, are detailed in the detailed description of the preferred embodiment and illustrated generally in FIGS. 1-12. More specifically, the tooling system of the present invention demonstrates a flexible tool device and securing device, which are adapted to contour to any size or shape of stock part.

Specifically, FIGS. 1-3 illustrate a profile edge 20, which has been produced on a stock part edge 22. As demonstrated by FIGS. 1 and 2, the profile edge 20 can be produced on any size and contour of stock part edge 22, regardless of whether it is straight, concave, convex, or of any other contour.

As a general background, stock parts 24 generally consist of a particleboard base. The particleboard base can be cut into the desired size and shape according to its intended use. After the particleboard has been cut, an upper layer 26 and lower layer 28 of laminate can be applied. Although lamination is sufficient to provide protection for a stock part's 26 upper and lower surfaces, it is a generally inadequate means for protecting a user from a particleboard stock part edge 22.

Accordingly, it is desirable to produce a profile edge on the stock part edges 22, such as by casting a polyurethane profile edge 20 to the unfinished particleboard stock part edges 22. Urethane profile edges 20 prove to be highly durable, rugged, and capable of permanently protecting a user from rough particleboard stock part edges 22. Other edges of the stock part that do not generally face a user, such as a stock part's 24 end edges 30, can be covered with previously known apparatuses and methods, such as a strip-like, snap-in plastic edging 32.

Turning to FIGS. 4-7, illustrated is the flexible tool device 34 of the present invention. More specifically, FIGS. 4 and 5 depict the two components of the flexible tool device 34—an elongated flexible tool 36 and at least one plug 38. The flexible tool 36 can be generally rectangular in shape, but can be of any overall shape, configuration, and/or general length. However, although any length of flexible tool 36 is contemplated, it is preferred that the flexible tool 36 measure no longer than 10 feet in length.

The flexible tool 36 can be created using generally known tooling systems and methods. For example, as already known in the art, a master tool set (not shown), comprising generally a master carrier, master part, and master cover, can be used as a primary molding tool. However, unlike previously known tooling systems and methods, the same master tool set can be used to create each flexible tool 36. In short, because each flexible tool 36 can bend and contour to any stock part edge 22, master tool sets that correspond to exact stock part geometries and desired profile edge configurations are no longer required.

Once the appropriate master tool set is assembled, a molding substance, such as a polyurethane, can be inserted into the master tool set. While it is desired that the molding substance be of a resinous nature, such as polyurethane, any substance capable of curing to a flexible and manageable embodiment can be used. However, the preferred embodiment of the flexible tool 36 is composed of a mixture of isocyanate and polymer, both of which can be obtained through most chemical retailers. Although varying proportions of the two components can be used, it is preferred that the polyurethane mixture be composed of approximately 40 parts isocyanate to 100 parts polymer.

After approximately 7 to 10 minutes of curing within the master tool set, the polyurethane flexible tool 36 can be handled. However, if a faster curing period is desired, a catalyst can be added to the polyurethane mixture or other resinous mixture. Alternatively, if a slower curing time is desired, a resinous mixture having a lesser amount of catalyst can also be use. Further, although it is desired that the flexible tool 36 be composed of polyurethane, any other resinous or substance capable of curing to a flexible and manageable embodiment can be used, such that the embodiment can be flexed around any shape, including sharp angles.

Referring back to FIGS. 4-7, it can be seen that the generally rectangular flexible tool 36 of the present invention has opposing upper 40 and lower 42 portions and an elongated cavity 44 defined therebetween. The elongated cavity 44 provides an opening 46 to at least one side of the flexible tool 36 for receipt of a stock part edge 22. Looking back briefly to FIGS. 1-3, it can be seen that the elongated cavity 44 of the flexible tool 36 generally defines the desired profile edge 20 configuration that will be casted to the stock part edge 22.

The flexible tool 36 also includes an injection inlet 48, which is generally located on the upper portion 40 of the flexible tool 36. The injection inlet 48 is in direct communication with the elongated cavity 44 for introduction of an edge material, such as a resinous substance or polyurethane, into the elongated cavity 44. While only one injection inlet 48 is present, it is contemplated that additional injection inlets 48 can be configured into the upper portion 40 or other parts of the flexible tool 36.

The flexible tool 36 also includes a flexible tool indexing portion 50, which is depicted in FIGS. 4-7 as a downwardly extending flange. As shown, the flexible tool indexing portion 30 of the preferred embodiment can consist of a flange. The flange can extend downward from the upper portion 40 of the flexible tool 36 and into the opening 46 of the side of the flexible tool 36. As specifically illustrated in FIGS. 4-7, the flexible tool indexing portion 50 of the preferred embodiment can removably index to both the plug 38 of the flexible tool device 34 and a stock part 24.

Focusing on FIGS. 4 and 5, it can be seen that the flexible tool device 34 of the present invention can further include at least one plug 38. It is preferred that the plug 38 be constructed of a rigid material such as, but not limited to, a hard plastic, rubber, or metal. However, it is also contemplated that the plug 38 could be of a non-rigid material. The plug 38 can generally include a fastening portion 52, a profile edge configuration portion 54, and a plug indexing portion 56.

As specifically demonstrated in FIGS. 4 and 5, the fastening portion 52 of the plug 38 can be removably affixed to a stock part 24 at an angle with respect to the stock part edge 22 that will receive the casted profile edge (not shown). Accordingly, it is desired that the fastening portion 52 of the plug 38 include at least one aperture 58 for receipt of at least one fastener 60, such as, but not limited to, a screw, bolt, or nail. Alternatively, if desired, the fastening portion 52 of the plug 38 can be affixed to the stock part 24 through use of any commercially known adhesive or the like.

FIG. 5 demonstrates the receipt of the profile edge configuration portion 54 of the plug 38 by the elongated cavity 44 of the flexible tool 36. In a practical sense, because the profile edge configuration portion 54 of the plug 38 is adapted to be firmly received within the elongated cavity 44, it can act as an "endcap" for the flexible tool 36. Thus, when a casting substance is injected into the elongated cavity 44, the profile edge configuration portion 54 of the plug 38 can prevent the casting substance from "blowing out" the end of the flexible tool 36. However, it is also contemplated that the flexible tool device 34 only include flexible tool 36 and not plug 38. Thus, the flexible tool 36 could provide at least one end portion (not shown) of its own, which could act as an endcap. Finally, as illustrated in FIG. 5, the plug indexing portion 56 of the preferred embodiment can be a channel, which receives the flexible tool indexing portion 50.

Focusing now on FIG. 7, detailed is the manner in which the flexible tool 36, stock part 24, and plug 38 interact and index with one another. Specifically, it can be seen that the fastening portion 52 of the plug 38 is removably affixed to the stock part 24 at an angle with respect to the stock part edge 22 (not shown). Further depicted is the flexibility of the flexible tool 36. Specifically, it is illustrated that flexible tool 36 can be shaped to any stock part edge 22, regardless of its contour.

Once the flexible tool 36 is contoured to the stock part edge 22, the flexible tool indexing portion 50 of the flexible tool 36, which can be a downwardly extending flange, can be received by the stock part indexing portion 62 and plug indexing portion 56. Such indexing ensures that the flexible tool 36 will hold its contour to the stock part edge 22.

Alternatively, it is also contemplated that instead of being a flange, the flexible tool indexing portion 50 can be an individual or series of protruding pins. The pins can thus adapted to be received by corresponding apertures within the stock part 24 and plug 38, the apertures generally defining a stock part indexing portion 62 and plug indexing portion 56, respectively. Additionally, it is also envisioned that instead of being adapted to receive a flexible tool indexing portion 50, the stock part indexing portion 62 and the plug indexing portion 56 can be an individual or series of protruding pins. The pins can thus adapted to be received by corresponding apertures within the flexible tool 36, the apertures generally defining a flexible tool indexing portion 50.

Turning to FIG. 8, illustrated generally is the securing device 64 of the present invention. Specifically, the securing device 64 of FIG. 8 can include a generally planar surface 66, such as a table top. Configured into the generally planar surface 66 can be a plurality of securing component channels 68, each having a lower portion 70 and countersunk portion 72, as further detailed by FIG. 9. Specifically, FIG. 9 is a rearward view taken along the arrows 9-9 of FIG. 8. Shown in the lower portion 70 of the securing component channel 68, is a channel member 74. The channel member 74 can be held in place within the lower portion 70 of the securing component channel 68 with at least one channel member fastener 76, such as a bolt, screw, or adhesive substance.

Referring back to FIG. 8, it is preferred that the securing component channels 68 are aligned in a parallel format within the generally planar surface 66 of the securing device 64. However, it is also contemplated that the plurality of securing component channels 68 can be offset angularly to one another or, alternatively, that only one securing component channel 68 exists.

As further depicted in FIG. 8, the securing device 64 of the preferred embodiment can further include at least one securing component 78, such as a clamp or the like. It is desired that each securing component 78 be adapted to produce a downward force toward the generally planar surface 66 of the securing device 64. The downward force will "sandwich" a flexible tool 36, stock part 24, plug 38, and securing plate 80 together, as is generally depicted in FIGS. 11 and 12.

However, referring back to FIGS. 8 and 9, each securing component 78 of the preferred embodiment can be supported by a securing component base 82 and securing component slide 84, the securing component slide 84 being preferably unitary with the securing component base 82. The securing component base 82 can elevate the securing component 78 above the generally planar surface 66 of the securing device 64 to allow for various thicknesses of stock parts 24 to be accommodated. As depicted in FIG. 9, it is contemplated that the securing component 78 will be removably affixed to the securing component base 82 with a securing component base fastener 86, such as a screw, bolt, adhesive, or the like.

Focusing further on FIG. 9, and also FIG. 10, which is a section view taken along the arrows 10-10 of FIG. 8, the manner in which the securing component can be securely positioned at a location along the securing component channel 68 is illustrated. Specifically, it can be seen that the securing component slide 84 can be fit within the countersunk portion 72 of the securing component channel 68. Extending downward from the securing component slide 84 is a biasing member fastener 88, such as a screw, bolt, or the like, which affixes to a biasing member 90. As depicted in FIGS. 8 and 11, the biasing member fastener 88 can be accessible from the top portion of the securing component slide 84 where it can be tightened and loosened.

Referring back to FIG. 8, when the biasing member fastener 88 is loose, the securing component slide 84 and accompanying securing component base 82 and securing component 78 can be slidably positioned at any location along the securing component channel 68. Such variable positioning of the securing component 78, allows the securing device 64 to accommodate any size and shape of stock part 24. Once the securing component 78 is positioned in the desired location along the securing component channel 68, it can be removably secured in place through actuation of the biasing member fastener 88 through the biasing member 90.

As specifically shown in FIG. 9, when the biasing member fastener 88 is actuated, the biasing member 90 is biased upward against the channel member 74. Thus, when fully biased, the biasing member 90 can prevent movement of the securing component slide 84 relative to the securing component channel 68. Although it is preferred that the biasing member fastener 88 be in threadable communication with the biasing member 90, it is contemplated that they can be connected in other manners also.

Referring now to FIGS. 11 and 12, illustrated is the securing device 64 of the present invention used in combination with the flexible tool 36, plug 38, stock part 24, and securing plate 80. Particularly, FIG. 11 illustrates that each securing component 78 can be positioned at any location along the securing component channel 68 to accommodate any stock part edge 22 (not shown). Once positioned at the appropriate location, the securing component 78 can then be actuated to provide a downward securing force, which is received by the securing plate 80.

The securing plate 80 can be positioned between the securing component 78 and flexible tool 36 and plug 38. Securing plate 80 uniformly distributes the force received from each securing component 78 along the contour of the indexed flexible tool 36. The uniform distribution of the securing force can allow an injected edge material, such as a polyurethane mix, to cast uniformly and cleanly as a profile edge against the stock part edge (not shown).

The present invention also includes a method of casting a profile edge to an edge of a stock part. As detailed in FIGS. 4-7, a flexible tool device 34 can be first contoured to a stock part edge 22. As demonstrated in FIG. 6, during the contouring, at least a portion of the stock part edge 22 can be inserted into, and received by, the opening 46 defined within the side of the flexible tool 36.

As next detailed by FIGS. 4 and 6, once the flexible tool 36 has been contoured to the stock part edge 22, the flexible tool indexing portion 50 can be indexed into, and received by, the stock part indexing portion 62. Generally, at this point, the flexible tool 36 can be left to cure against the stock part edge 22 for a period of approximately 4 to 6 hours. However, if the flexible tool 36 is composed of a resinous substance having a faster curing time or containing a catalyst permitting it to cure at a faster rate, the flexible tool 36 may be left to cure for a shorter time period. Alternatively, if a resinous substance is used have little or no catalyst included, the curing period can take longer and thus the flexible tool 36 may need to cure against the stock part edge 22 for a longer period of time.

The fastening portion 52 of the plug 38 can then be removably affixed to the stock part 24 at an angle with respect to the stock part edge 22. The profile edge configuration portion 54 of the plug 38 can accordingly be received by the elongated cavity 44 of the flexible tool 36 while the flexible tool indexing portion 50 can be inserted into the channel of the plug indexing portion 56.

The indexed flexible tool 36, stock part 24, and plug 38 can then be placed upon the generally flat surface 66 of the securing device 64, as illustrated in FIG. 11. The securing components 78 of the securing device 64 can be adjustably positioned to preferred locations along each securing component channel 68 to accommodate the flexible tool 36, stock part 24, and plug 38.

After each securing component 78 is secured in place through the biasing of biasing member 90 upward against the channel member 74, an edge material, such as a resinous mixture or a polyurethane substance comprising a proportion of isocyanate to polymer (not shown), can be introduced into the elongated cavity 44 of the flexible tool 36 through an injection inlet 48 (See FIGS. 4 and 7).

While any proportion of isocyanate to polymer can be used in creation of the profile edge 20, it is desired that the polyurethane mixture comprise approximately 40 parts isocyanate to 100 parts polymer. However, if it is desired that the profile edge 20 be of an increased rigidity, the proportion can be altered. After a sufficient volume of edge material has been injected into the elongated cavity 44, at least one securing plate 80 can be placed over the flexible tool 36 so that it overlaps with a portion of the stock part 24.

As depicted in FIGS. 11 and 12, after the securing plate 80 has been placed upon the flexible tool 36 and stock part 24, each securing component 78 can be activated, thereby producing a downward securing force. The securing force is received by the securing plate 80 and distributed along the entire contour of flexible tool 36, thereby ensuring that the polyurethane profile edge 20 (not shown) is uniformly casted to the stock part edge 22. After 7-10 minutes, when curing is complete, the securing components 78 can be released and the flexible tool 36 and plug 38 removed to reveal a casted polyurethane profile edge 20 as depicted in FIGS. 1-3. Again, if a faster curing period is desired, a catalyst can be added to the polyurethane mixture or other resinous mixture. Alternatively, if a slower curing time is desired, a resinous mixture having a lesser amount of catalyst can also be use. Finally, if desired, the stock part indexing portion 62, which generally defines a channel within the stock part 24, can be filled with a laminate filler substance or the like.

It may therefore be appreciated from the above detailed description of the preferred embodiment of the present invention that it teaches a tooling system and method for producing a profile edge on a stock part, for example, by casting a profile edge on a stock part, such as a table or the like. More specifically, the tooling system of the present invention demonstrates a flexible tool device and securing device, which are adapted to contour to any size or shape of stock part.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

We claim:

1. A method of producing a profile edge on a stock part, comprising:
   providing a stock part with opposed ends defining an edge therebetween;
   contouring a flexible tool to said stock part, said flexible tool having opposing first and second portions and an elongated cavity defined therebetween, said cavity defining a profile edge configuration and being in fluid communication with said stock part;
   introducing an edge material into said cavity of said flexible tool; and
   removing said flexible tool from said stock part.

2. The method of claim 1, wherein said flexible tool comprises a resinous composition.

3. The method of claim 2, wherein said resinous composition comprises a polyurethane composition.

4. The method of claim 1, wherein contouring said flexible tool to said stock part comprises receiving at least a portion of said stock part within an opening defined in a first side of said flexible tool.

5. The method of claim 4, wherein contouring said flexible tool device to said stock part further comprises indexing said flexible tool to said stock part, wherein one of said flexible tool and said stock part comprises at least one indexing portion received by the other.

6. The method of claim 4, wherein said resinous composition comprises a polyurethane composition.

7. The method of claim 1, further comprising positioning at least one securing component on a securing device to engage said flexible tool and secure said flexible tool to said stock part by slidably positioning said securing component upon at least one securing component channel, said securing component channel being defined on a surface component of said securing device.

8. The method of claim 7, wherein positioning at least one securing component on said securing device to engage said flexible tool and secure said flexible tool to said stock part further comprises using at least one securing plate, said securing plate being positioned between said securing component and said flexible tool to distribute force from said securing component.

9. The method of claim 1, wherein introducing an edge material into said cavity of said flexible tool comprises introducing an edge material comprising a resinous composition.

* * * * *